US012780310B2

(12) United States Patent
Matsumoto et al.

(10) Patent No.: US 12,780,310 B2
(45) Date of Patent: Nov. 3, 2026

(54) TRAVEL CONTROL DEVICE FOR VEHICLE

(71) Applicant: TOYOTA JIDOSHA KABUSHIKI KAISHA, Toyota (JP)

(72) Inventors: Ryo Matsumoto, Toyota (JP); Jiro Miyawaki, Ebina (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 7 days.

(21) Appl. No.: 18/441,728

(22) Filed: Feb. 14, 2024

(65) Prior Publication Data

US 2024/0278831 A1 Aug. 22, 2024

(30) Foreign Application Priority Data

Feb. 21, 2023 (JP) ................................ 2023-025160

(51) Int. Cl.
*B60W 30/12* (2020.01)
*B62D 15/02* (2006.01)

(52) U.S. Cl.
CPC ....... *B62D 15/025* (2013.01); *B60W 2540/18* (2013.01)

(58) Field of Classification Search
CPC ............. B60W 2540/18; B60W 30/12; B60W 2420/403; B60W 2510/205; B62D 15/025
See application file for complete search history.

(56) References Cited

U.S. PATENT DOCUMENTS

| | | | | |
|---|---|---|---|---|
| 7,692,534 | B2 | 4/2010 | Kataoka et al. | |
| 8,352,124 | B2 | 1/2013 | Taguchi | |
| 8,682,500 | B2 | 3/2014 | Sakugawa | |
| 8,818,634 | B2 | 8/2014 | Fujita et al. | |
| 9,168,953 | B2 | 10/2015 | Mitsumoto et al. | |
| 9,714,034 | B2 | 7/2017 | Otake et al. | |
| 9,880,558 | B2 | 1/2018 | Nakamura | |
| 9,902,399 | B2 | 2/2018 | Torii et al. | |
| 10,345,443 | B2 | 7/2019 | Masui et al. | |
| 10,611,240 | B2 | 4/2020 | Masui et al. | |
| 2006/0030987 | A1* | 2/2006 | Akita .................. | B62D 15/025 701/41 |
| 2013/0060414 | A1 | 3/2013 | Lee et al. | |
| 2015/0274164 | A1 | 10/2015 | Terazawa et al. | |
| 2017/0036694 | A1 | 2/2017 | Okuda et al. | |
| 2017/0088175 | A1 | 3/2017 | Okuda et al. | |

(Continued)

FOREIGN PATENT DOCUMENTS

| | | |
|---|---|---|
| DE | 11 2020 004 946 T5 | 7/2022 |
| FR | 3 110 536 A1 | 11/2021 |

(Continued)

*Primary Examiner* — Gonzalo Laguarda
(74) *Attorney, Agent, or Firm* — Sughrue Mion, PLLC

(57) ABSTRACT

A travel control device for a vehicle includes an object information acquisition device, an automatic steering device, and an electronic control unit. The electronic control unit is configured to gradually decrease a target correction quantity of a steering angle when the electronic control unit determines that travel control needs to be ended. The electronic control unit is configured to change a degree of decrease of the target correction quantity to different degrees based on a magnitude relationship between a target control quantity and an actual control quantity closest to a time point at which it is determined that the travel control needs to be ended.

10 Claims, 11 Drawing Sheets

(56) References Cited

U.S. PATENT DOCUMENTS

| | | | | |
|---|---|---|---|---|
| 2017/0232973 | A1* | 8/2017 | Otake | B60W 30/12<br>701/43 |
| 2019/0241182 | A1* | 8/2019 | Sato | B60R 21/00 |
| 2022/0063722 | A1 | 3/2022 | Omikawa et al. | |
| 2022/0250629 | A1* | 8/2022 | Okada | G06V 20/588 |
| 2023/0023426 | A1* | 1/2023 | Hamaguchi | B62D 15/025 |
| 2023/0398980 | A1* | 12/2023 | Horiguchi | B60W 50/087 |
| 2024/0083466 | A1* | 3/2024 | Jang | B60W 60/0053 |

FOREIGN PATENT DOCUMENTS

| | | | |
|---|---|---|---|
| JP | 2010-6279 | A | 1/2010 |
| JP | 2015-189409 | A | 11/2015 |
| JP | 2015-189411 | A | 11/2015 |
| JP | 2017-35925 | A | 2/2017 |
| JP | 2017-61280 | A | 3/2017 |
| JP | 2017-65273 | A | 4/2017 |
| JP | 2022-39311 | A | 3/2022 |
| KR | 10-2021-0044329 | A | 4/2021 |

* cited by examiner

WHEN |θdif|≤θdifc (WHEN Ka=1)

WHEN θdif>θdifc (WHEN Ka<1)

WHEN θdif<-θdifc (WHEN Ka>1)

TRAVEL CONTROL DEVICE FOR VEHICLE

CROSS-REFERENCE TO RELATED APPLICATION

This application claims priority to Japanese Patent Application No. 2023-025160 filed on Feb. 21, 2023, incorporated herein by reference in its entirety.

BACKGROUND

1. Technical Field

The disclosure relates to a travel control device for a vehicle such as an automobile.

2. Description of Related Art

A travel control device that controls travel of a vehicle such that the vehicle travels along a lane within the lane is known as one travel control device for a vehicle such as an automobile. A lane departure prevention device and a lane keeping device are known as such a type of travel control device.

The lane departure prevention device performs lane departure prevention control for detecting a position of a vehicle relative to a lane and automatically steering a steering wheel such that a likelihood of departure of the vehicle from the lane decreases when it is determined that there is a likelihood that the vehicle will depart from the lane based on the detected position of the vehicle. In this specification, lane departure prevention control is referred to as LDA (which is an abbreviation of lane departure alert with control).

The lane keeping device performs lane keeping control for setting a target trajectory for allowing a vehicle to travel along a lane within the lane based on the lane or a travel trajectory of a preceding vehicle and automatically steering a steering wheel such that the vehicle travels along the target trajectory. In this specification, lane keeping control is referred to as LTA (which is an abbreviation of lane tracing assist).

In any of LDA and LTA, when control ending conditions thereof are satisfied such as when no white line can be detected, automatic steering needs to be switched to a driver's steering and thus a control quantity for automatic steering decreases gradually at a preset rate of decrease. For example, In Japanese Unexamined Patent Application Publication No. 2017-061280 (JP 2017-061280 A), a steering support control device that gradually decreases a target value of automatic steering to a minimum value in a predetermined time when disabling conditions of automatic steering are satisfied in a situation in which the vehicle is traveling on a curved road is described.

SUMMARY

As described above, in any of LDA and LTA, when control ending conditions are satisfied, a control quantity of automatic steering needs to decrease gradually and a desirable rate of decrease of the control quantity differs according to a situation of the vehicle when the control ending conditions are satisfied. For example, when the target control quantity is greater than the actual control quantity, the control ends in a situation in which the control needs to be continuously performed and thus it is preferable that the rate of decrease of the control quantity be low. On the other hand, when the actual control quantity is greater than the target control quantity, the control ends in a situation in which the control is not necessary and thus it is preferable that the rate of decrease of the control quantity be high.

However, in the travel control device, when the control ending conditions are satisfied, the control quantity of automatic steering decreases gradually at a preset rate of decrease and thus the control quantity cannot be gradually decreased according to a magnitude relationship between the target control quantity and the actual control quantity.

The disclosure provides a travel control device that controls travel of a vehicle such that the vehicle travels along a lane within the lane and can gradually decrease a control quantity according to a magnitude relationship between a target control quantity and an actual control quantity when control ending conditions are satisfied.

An aspect of the disclosure provides a travel control device for a vehicle. The travel control device for a vehicle includes an object information acquisition device configured to acquire information of an object in front of the vehicle, an automatic steering device, and an electronic control unit configured to perform travel control of the vehicle. The travel control includes identifying a lane based on the information acquired by the object information acquisition device, calculating a target control quantity associated with turning for allowing the vehicle to travel along the lane within the lane, calculating a target correction quantity of a steering angle for causing an actual control quantity associated with turning of the vehicle to reach the target control quantity, and causing the vehicle to travel along the lane within the lane by controlling the automatic steering device such that the correction quantity of the steering angle reaches the target correction quantity. The electronic control unit is configured to gradually decrease the target correction quantity of the steering angle when the electronic control unit determines that the travel control needs to be ended. The electronic control unit is configured to change a degree of decrease of the target correction quantity to different degrees based on a magnitude relationship between the target control quantity and the actual control quantity closest to a time point at which the electronic control unit determines that the travel control needs to be ended.

With this configuration, when it is determined that travel control needs to be ended, the target correction quantity of the steering angle is gradually decreased, but the degree of decrease of the target correction quantity is changed to different degrees based on the magnitude relationship between the target control quantity and the actual control quantity closest to the time point at which it is determined that the travel control needs to be ended. Accordingly, it is possible to set the degree of decrease of the target correction quantity to be variable according to the magnitude relationship between the target control quantity and the actual control quantity.

In the travel control device according to the aspect of the disclosure, the degree of decrease of the target correction quantity may be a first degree of decrease when the actual control quantity is greater than the target control quantity. The degree of decrease of the target correction quantity may be a second degree of decrease when the target control quantity is greater than the actual control quantity. The electronic control unit may be configured to set the first degree of decrease to be greater than the second degree of decrease.

According to this aspect, when the actual control quantity is greater than the target control quantity, the degree of decrease of the target correction quantity is greater than when the target control quantity is greater than the actual control quantity. Accordingly, in a situation in which the actual control quantity is greater than the target control quantity, it is possible to decrease the likelihood that unnecessary travel control will continue for a long time. On the other hand, when the actual control quantity is greater than the target control quantity, the degree of decrease of the target correction quantity does not become greater. Accordingly, in a situation in which the actual control quantity is greater than the target control quantity, it is possible to decrease the likelihood that travel control will end early.

In the travel control device according to the aspect of the disclosure, the electronic control unit may be configured to set the degree of decrease of the target correction quantity to be greater when the electronic control unit determines that (i) the actual control quantity is greater than the target control quantity and (ii) a difference between the actual control quantity and the target control quantity is equal to or greater than a first reference value.

According to this aspect, when it is determined that the actual control quantity is greater than the target control quantity and the difference between the actual control quantity and the target control quantity is greater than the first reference value, the degree of decrease of the target correction quantity increases. Accordingly, the degree of decrease of the target correction quantity is not changed in a situation in which the difference between the actual control quantity and the target control quantity is small and a necessity for increasing the degree of decrease of the target correction quantity is low, and the degree of decrease of the target correction quantity can be increased in a situation in which a necessity for increasing the degree of decrease of the target correction quantity is high.

In the travel control device according to the aspect of the disclosure, the electronic control unit may be configured to set the degree of decrease of the target correction quantity to be less when the electronic control unit determines that (i) the target control quantity is greater than the actual control quantity and (ii) a difference between the target control quantity and the actual control quantity is equal to or greater than a second reference value.

According to this aspect, when it is determined that the target control quantity is greater than the actual control quantity and the difference between the target control quantity and the actual control quantity is greater than the second reference value, the degree of decrease of the target correction quantity decreases. Accordingly, the degree of decrease of the target correction quantity is not changed in a situation in which the difference between the target control quantity and the actual control quantity is small and a necessity for decreasing the degree of decrease of the target correction quantity is low, and the degree of decrease of the target correction quantity can be decreased in a situation in which a necessity for decreasing the degree of decrease of the target correction quantity is high.

In the travel control device according to the aspect of the disclosure, the electronic control unit may be configured to set the degree of decrease of the target correction quantity to increase as the difference between the actual control quantity and the target control quantity increases.

According to this aspect, since the degree of decrease of the target correction quantity can be increased as the difference between the actual control quantity and the target control quantity increases, it is possible to end automatic steering early using the automatic steering device even when the difference between the actual control quantity and the target control quantity is large.

In the travel control device according to the aspect of the disclosure, the electronic control unit may be configured to set the degree of decrease of the target correction quantity to decrease as the difference between the target control quantity and the actual control quantity increases.

According to this aspect, since the degree of decrease of the target correction quantity decreases as the difference between the target control quantity and the actual control quantity increases, it is possible to continuously perform automatic steering using the automatic steering device longer as the difference between the target control quantity and the actual control quantity increases.

In the travel control device according to the aspect of the disclosure, the electronic control unit may be configured to set the degree of decrease of the target correction quantity to decrease through at least one of a decrease of a rate of decrease of the target correction quantity and a delay of start of decrease of the target correction quantity.

According to this aspect, it is possible to decrease the degree of decrease of the target correction quantity through one or both of a decrease of the rate of decrease of the target correction quantity and a delay of start of decrease of the target correction quantity.

In the travel control device according to the aspect of the disclosure, the electronic control unit may be configured not to change the degree of decrease of the target correction quantity when the target correction quantity is a correction quantity by which the vehicle is moved outward in the curved lane from the lane and the electronic control unit determines that the lane is curved.

In general, when it is determined that a lane is curved and the target correction quantity is a correction quantity by which the vehicle is moved outward in the curve from the lane, the target correction quantity is smaller and a necessity for changing the degree of decrease of the target correction quantity is lower than when it is determined that the lane is curved and the target correction quantity is a correction quantity by which the vehicle is moved inward in the curve from the lane.

According to this aspect, when it is determined that a lane is curved and the target correction quantity is a correction quantity by which the vehicle is moved outward in the curve from the lane, it is possible to omit change of the degree of decrease of the target correction quantity.

In the travel control device according to the aspect of the disclosure, the electronic control unit may be configured to estimate a likelihood of departure of the vehicle from the lane based on the information acquired by the object information acquisition device. The electronic control unit may be configured to calculate the target control quantity associated with turning as a target control quantity for decreasing the likelihood of departure when the electronic control unit determines that the likelihood of departure is present.

According to this aspect, a likelihood of departure of the vehicle from the lane is estimated, and a target control quantity associated with turning is calculated as the target control quantity for decreasing the likelihood when it is determined that there is a likelihood of departure. Accordingly, it is possible to decrease the likelihood of departure of the vehicle from the lane through travel control.

In the travel control device according to the aspect of the disclosure, the electronic control unit may be configured to set a target trajectory for allowing the vehicle to travel along the lane within the lane based on the information acquired by the object information acquisition device. The electronic control unit may be configured to calculate the target control quantity associated with turning as a target control quantity for causing the vehicle to travel along the target trajectory.

According to this aspect, a target trajectory for causing the vehicle to travel along a lane within the lane is set, and a target control quantity associated with turning is calculated as the target control quantity for causing the vehicle to travel along the target trajectory. Accordingly, it is possible to cause the vehicle to travel as close to the target trajectory as possible through travel control.

In this specification, a "lane" is a travel area of a vehicle which is defined by white lines, curbstones, road markings, or the like. A "target control quantity associated with turning" and an "actual control quantity associated with turning" are a target value and an actual value of a control quantity for changing a travel direction of the vehicle, respectively. As will be described later, a "control quantity" may be a steering angle, a lateral acceleration of a vehicle, a yaw rate of a vehicle, an estimated lateral acceleration of a vehicle (a product of a vehicle speed and a yaw rate of a vehicle), a yaw moment of a vehicle, or the like.

In the aforementioned description, elements of the disclosure corresponding to an embodiment which will be described later have parenthesized names and/or reference signs used in the embodiment added thereto for the purpose of easy understanding of the disclosure. However, the elements of the disclosure are not limited to the elements of the embodiment corresponding to the parenthesized names and/or reference signs. Other objectives, other features, and accompanying advantages of the disclosure will be easily understood from description of an embodiment of the disclosure which will be given below with reference to the following drawings.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A travel control device for a vehicle according to an embodiment of the disclosure will be described below in detail with reference to the accompanying drawings.

Figure 1:
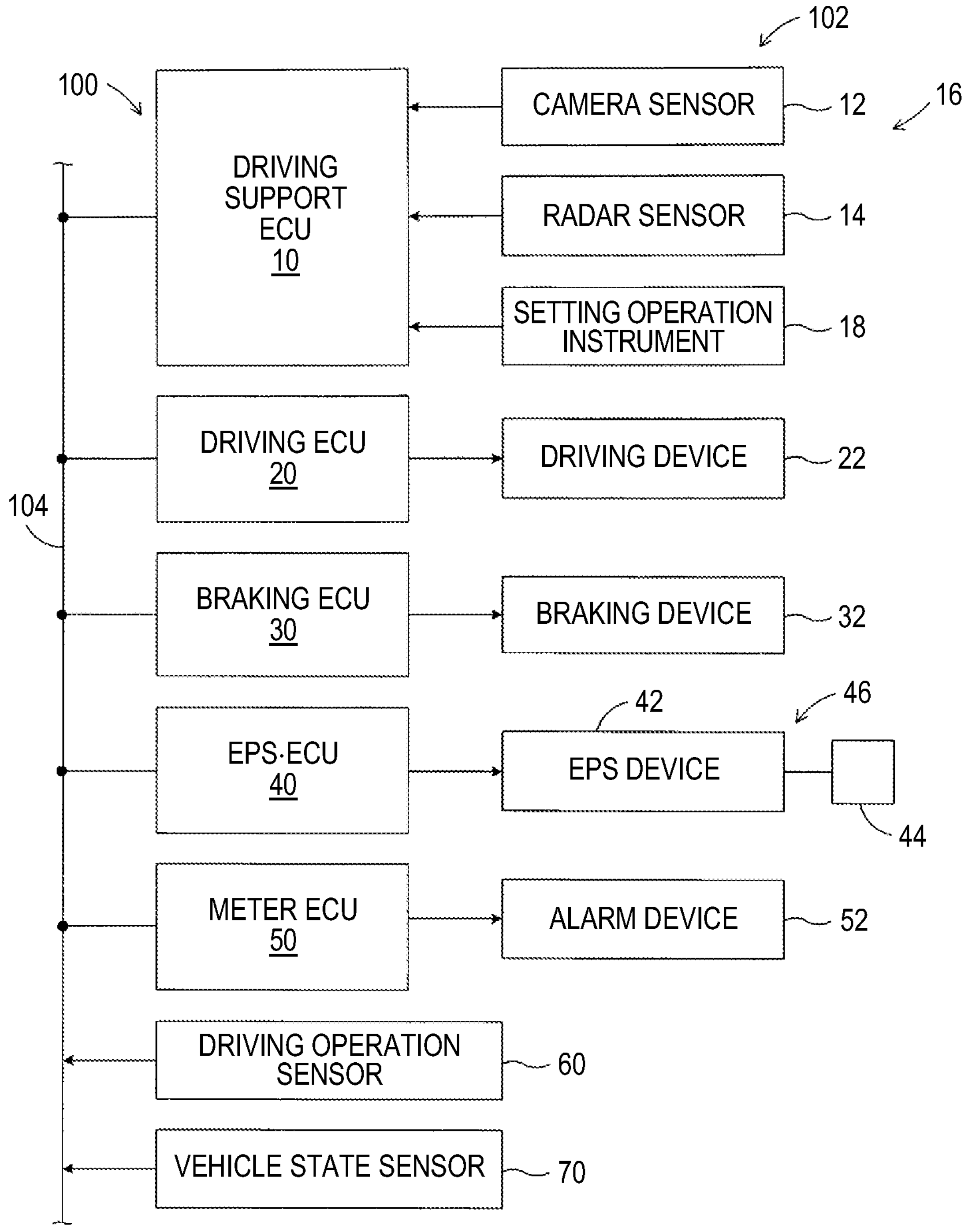
FIG. 1 is a diagram schematically illustrating a configuration of a travel control device according to an embodiment.

As illustrated in FIG. 1, a travel control device 100 according to an embodiment of the disclosure is applied to a vehicle 102 and includes a driving support ECU 10. The vehicle 102 is a vehicle of which automated driving is possible and includes a driving ECU 20, a braking ECU 30, an electric power steering ECU 40, and a meter ECU 50. ECU is an electronic control unit including a microcomputer as a principal part. In the following description, the vehicle 102 is referred to as a host vehicle 102 as needed to distinguish from another vehicle, and electric power steering is referred to as EPS.

A microcomputer of each ECU includes a CPU, a ROM, a RAM, a readable writable nonvolatile memory (N/M), and an interface (I/F). The CPU realizes various functions by executing instructions (programs, routines) stored in the ROM. The ECUs are connected to each other via a controller area network (CAN) 104 in a data exchangeable manner (a communicative manner). Accordingly, a detected value from a sensor (including a switch) connected to a specific ECU or the like is transmitted to other ECUs.

The driving support ECU 10 is a core control device that performs driving support control of a vehicle such as LDA or LTA. In the embodiment, the driving support ECU 10 performs LDA and LTA in cooperation with other ECUs as will be described later in detail.

A camera sensor 12 and a radar sensor 14 are connected to the driving support ECU 10. The camera sensor 12 and the radar sensor 14 include a plurality of camera devices and a plurality of radar devices, respectively. The camera sensor 12 and the radar sensor 14 serve as an object information acquisition device 16 that acquires at least information of an object in front of the vehicle 102.

Although not illustrated in the drawing, each camera device of the camera sensor 12 includes a camera unit that images surroundings of the vehicle 102 and a recognition unit that recognizes an object such as a white line of a road and another vehicle by analyzing image data acquired by imaging with the camera unit. The recognition unit supplies information on the recognized object to the driving support ECU 10 every predetermined time.

Each radar device of the radar sensor 14 includes a radar transmission/reception unit and a signal processing unit (not illustrated). The radar transmission/reception unit radiates millimeter radio waves (hereinafter referred to as "millimeter waves") and receives millimeter waves (that is, reflected waves) reflected by a three-dimensional object (for example, another vehicle or a bicycle) in a radiation range. The signal processing unit acquires information indicating a relative distance and a relative speed between a host vehicle and a three-dimensional object, a relative position (direction) of the host vehicle to the three-dimensional object every predetermined time based on phase differences between radiated millimeter waves and received reflected waves, attenuation levels of the reflected waves, a time until reflected waves are received after millimeter waves have been radiated, and the like and supplies the acquired information to the driving support ECU 10. Instead of the radar sensor 14 or in addition to the radar sensor 14, a Light Detection And Ranging (LiDAR) device may be used.

A setting operation instrument 18 is connected to the driving support ECU 10, and the setting operation instrument 18 is provided at a position which is operated by a driver. Although not illustrated in FIG. 1, the setting operation instrument 18 in this embodiment includes an LDA switch and an LTA switch, and the driving support ECU 10 performs LDA when the LDA switch is turned on and performs LTA when the LTA switch is turned on. The LDA switch and the LTA switch may be omitted.

A driving device 22 that accelerates the vehicle 102 by applying a driving force to driving wheels which are not illustrated in FIG. 1 is connected to the driving ECU 20. The driving ECU 20 controls the driving device such that the driving force generated by the driving device 22 changes according to a driver's driving operation in a normal state and controls the driving device 22 based on an instruction signal when the instruction signal is received from the driving support ECU 10.

A braking device 32 that decelerates the vehicle 102 through braking by applying a braking force to vehicle wheels which are not illustrated in FIG. 1 is connected to the braking ECU 30. The braking ECU 30 controls the braking device such that the braking force generated by the braking device 32 changes according to a driver's braking operation in a normal state and performs automatic braking by controlling the braking device 32 based on an instruction signal when the instruction signal is received from the driving support ECU 10.

An EPS device 42 is connected to the EPS ECU 40. The EPS ECU 40 controls a steering assist torque by controlling the EPS device 42 based on a steering torque Ts and a vehicle speed V detected by a driving operation sensor 60 and a vehicle state sensor 70 which will be described later and reduces a steering burden on a driver. The EPS ECU 40 can steer a steering wheel 44 as needed by controlling the EPS device 42. Accordingly, the EPS ECU 40 and the EPS device 42 serve as an automatic steering device 46 that automatically steers the steering wheel 44 as needed.

An alarm device 52 is connected to the meter ECU 50. The alarm device 52 operates when it is determined that there is a likelihood that the vehicle 102 will depart from a lane and issues an alarm indicating that there is a likelihood of departure of the vehicle from the lane. The alarm device 52 may be one of an alarm device issuing a visual alarm such as an indicator or an alarm lamp, an alarm device issuing an auditory alarm such as an alarm buzzer, and an alarm device issuing a tactual alarm such as vibration of a seat or may be an arbitrary combination thereof.

The driving operation sensor 60 and the vehicle state sensor 70 are connected to the CAN 104. Information (referred to as sensor information) detected by the driving operation sensor 60 and the vehicle state sensor 70 is transmitted to the CAN 104. The sensor information transmitted to the CAN 104 can be appropriately used by the ECUs. The sensor information may be information of a sensor connected to a specific ECU and may be transmitted from the specific ECU to the CAN 104.

The driving operation sensor 60 includes a driving operation amount sensor and a braking operation amount sensor. The driving operation sensor 60 includes a steering angle sensor and a steering torque sensor. The vehicle state sensor 70 includes a wheel speed sensor, a longitudinal acceleration sensor, a lateral acceleration sensor, and a yaw rate sensor. In this embodiment, the steering angle sensor and the steering torque sensor detect a steering angle θ and a steering torque Ts of which a value when the vehicle 102 is turned to right is positive, respectively.

Figure 2:
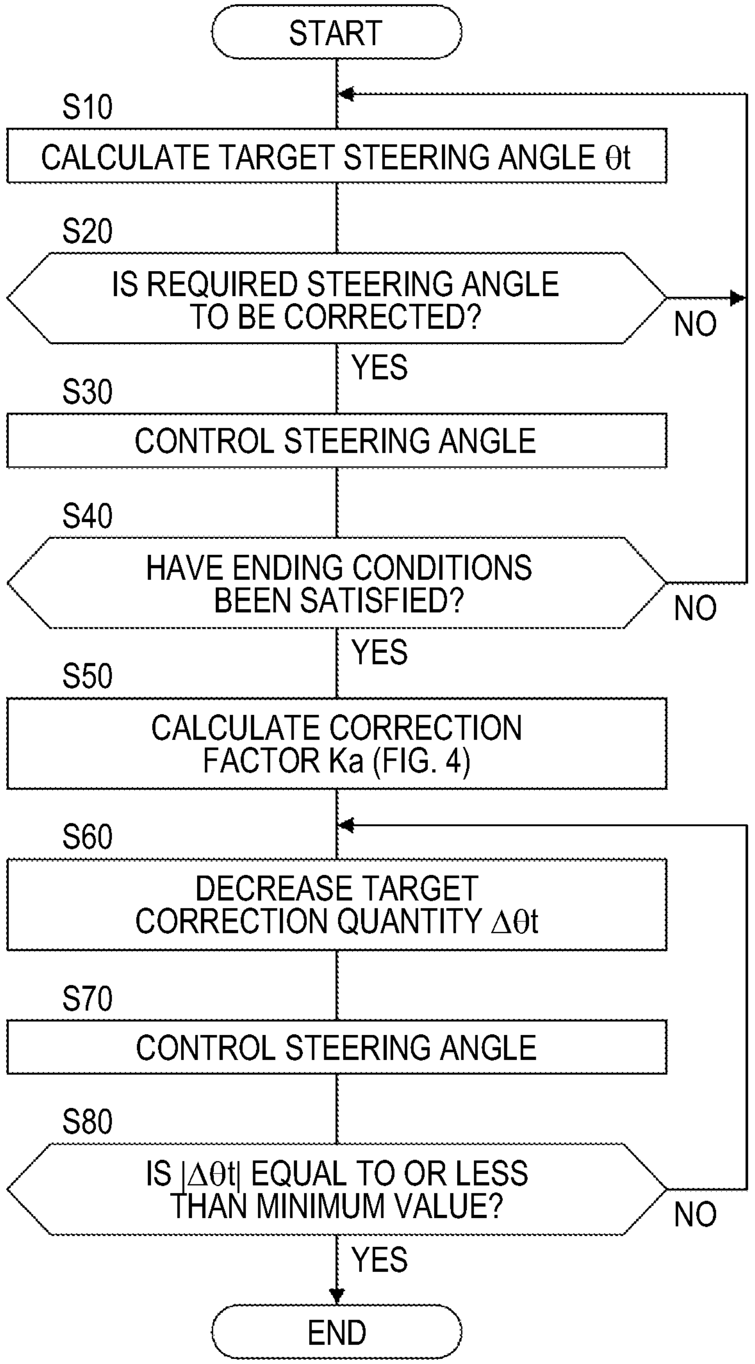
FIG. 2 is a flowchart illustrating an LDA routine according to the embodiment.

In the embodiment, the ROM of the driving support ECU 10 stores an LDA program corresponding to the flowchart illustrated in FIG. 2. The CPU performs LDA according to the embodiment in accordance with the program.

LDA Routine According to Embodiment

An LDA routine according to the embodiment will be described below with reference to the flowchart illustrated in FIG. 2. LDA based on the flowchart illustrated in FIG. 2 is repeatedly performed every control cycle by the CPU of the driving support ECU 10 when the LDA switch of the setting operation instrument 18 not illustrated in FIG. 1 is turned on.

First, in Step S10, the CPU calculates a target steering angle θt for preventing departure of the vehicle from a lane based on a positional relationship of the vehicle 102 to the lane detected by the camera sensor 12. The target steering angle θt may be calculated, for example, in the same way as described in Japanese Unexamined Patent Application Publication No. 2022-39311 (JP 2022-39311 A).

Figure 3A:
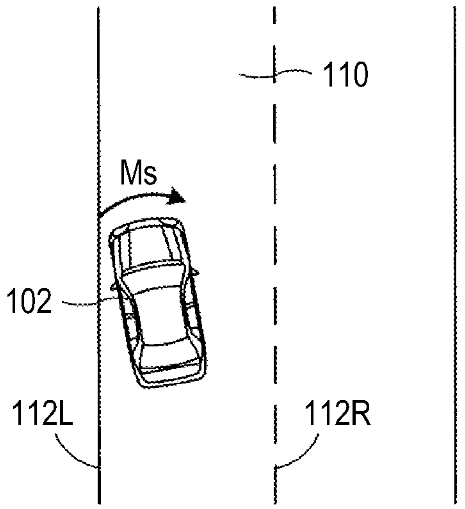
FIG. 3A is a diagram illustrating a relationship between a departure direction of a vehicle and a controlling direction of a steering angle θ in LDA.
Figure 3B:
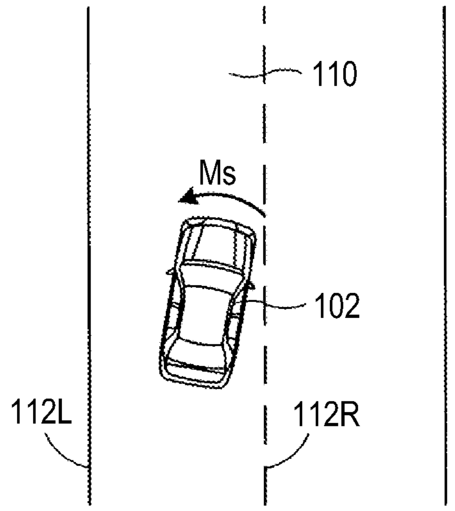
FIG. 3B is a diagram illustrating a relationship between a departure direction of a vehicle and a controlling direction of a steering angle θ in LDA.

For example, when there is a likelihood that the vehicle 102 will depart from a lane 110 over a left white line 112L as illustrated in FIG. 3A, the target steering angle θt is calculated as a steering angle for applying a yaw moment Ms in a right turn direction to the vehicle 102 and causing the vehicle to approach a right white line 112R. On the other hand, when there is a likelihood that the vehicle 102 will depart from the lane 110 over the right white line 112R as illustrated in FIG. 3B, the target steering angle θt is calculated as a steering angle for applying a yaw moment Ms in a left turn direction to the vehicle 102 and causing the vehicle to approach the left white line 112L. An absolute value of a difference Δθ between the target steering angle θt and an actual steering angle θ detected by the steering angle sensor increases as the likelihood of departure of the vehicle from the lane increases.

In Step S20, the CPU determines whether the steering angle is to be corrected, for example, by determining whether the difference 40 between the target steering angle θt and the actual steering angle θ, that is, an absolute value of a target correction quantity Δθt of the steering angle, is equal to or greater than a reference value 40c (a positive integer). The CPU temporarily ends this control when the determination result is negative and causes this control to proceed to Step S30 when the determination result is positive.

In Step S30, the CPU controls the steering angle using the automatic steering device 46 such that the actual steering angle θ reaches the target steering angle θt, that is, such that a correction quantity 40 of the steering angle θ reaches the target correction quantity Δθt, by outputting an instruction signal to the EPS ECU 40. It is assumed that the target steering angle θt, the correction quantity 40 of the steering angle, and the target correction quantity Δθt have positive values when the vehicle turns to right similarly to the steering angle θ.

In Step S40, the CPU determines whether LDA ending conditions have been satisfied. The CPU temporarily ends this control when the determination result is negative and causes this control to proceed to Step S50 when the determination result is positive.

In this case, it may be determined that the LDA ending conditions have been satisfied when one of the following events is determined.

A: The travel control device 100 does not function normally due to failure of the camera sensor 12, abnormality of the EPS device 42, abnormality of the wheel speed sensor, or the like.

B: A steering operation or an operation of turning off the LDA switch is performed by a driver such as the driver's override steering or the driver's operating a direction indicator.

C: A situation in which LDA cannot continue occurs on a road such as loss of white lines or an obstacle on the road.

Figure 4:
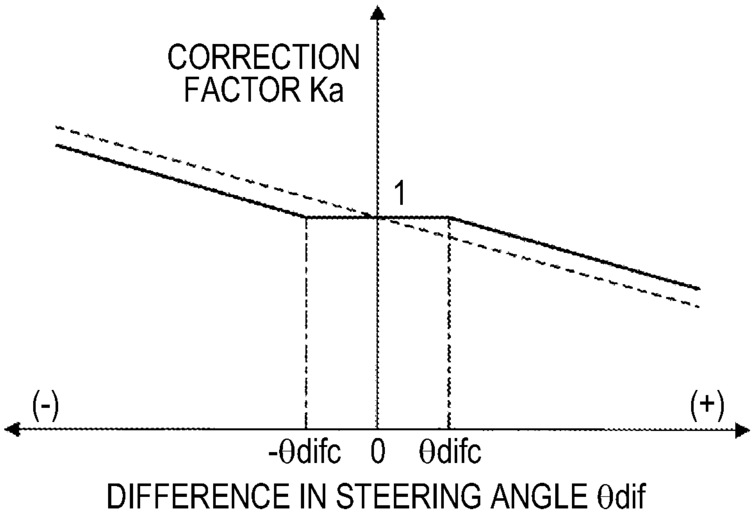
FIG. 4 is a diagram illustrating a relationship between a difference in steering angle θdif and a correction factor Ka.

In Step S50, the CPU calculates a difference θdif=(θt−θa)signet between a target steering angle θt and an actual steering angle θa with the sign of the target steering angle θt as sign θt and calculates a correction factor Ka with reference to a map corresponding to a solid line in FIG. 4 based on the difference in steering angle θdif.

When the absolute value of the difference in steering angle θdif is equal to or less than a reference value θdifc (a positive integer) as illustrated in FIG. 4, the correction factor Ka is 1. When the difference in steering angle θdif is a positive value greater than the reference value θdifc, the correction factor Ka is a value which is less than 1 and which decreases as the difference in steering angle θdif increases. On the other hand, when the difference in steering angle θdif is a negative value less than-θdifc, the correction factor Ka is a value which is greater than 1 and which increases as the difference in steering angle θdif decreases (as the absolute value of the difference θdif increases).

In Step S60, the CPU decreases the target correction quantity Δθt by calculating the target correction quantity Δθt of the steering angle θ based on Expression (1). In Expression (1), Δθts is a target correction quantity Δθt at a time point at which positive determination has been performed in Step S40. Kb is a basic decrease coefficient greater than 0 and less than 1. Here, t is an elapsed time from the time point at which positive determination has been performed in Step S40.

$$\Delta\theta t = \Delta\theta ts - KaKb\Delta\theta ts \cdot t \quad (1)$$

In Step S70, the CPU controls the steering angle such that the correction quantity 40 of the steering angle θ by the automatic steering device 46 reaches the target correction quantity Δθt by outputting an instruction signal to the EPS ECU 40 similarly to Step S30.

In Step S80, the CPU determines whether the absolute value of the target correction quantity Δθt is equal to or less than a preset minimum value 40 min (a positive integer). The CPU causes this control to return to Step S60 when the determination result is negative and ends this control when the determination result is positive.

As can be seen from the aforementioned description, since the determination result of Step S40 is negative when the LDA ending conditions have not been satisfied, Steps S10 to S40 are repeatedly performed. Accordingly, when there is a likelihood of departure of the vehicle 102 from a lane, the travel direction of the vehicle changes to a direction in which the likelihood of departure from the lane decreases and thus departure from the lane is prevented.

Since the determination result of Step S40 is positive when the LDA ending conditions have been satisfied, Steps S50 to S80 are repeatedly performed until the absolute value of the target correction quantity Δθt becomes equal to or less than the minimum value Δθmin, and thus the magnitude of the target correction quantity Δθt decreases gradually according to the basic decrease coefficient Kb and the correction factor Ka. The correction factor Ka is calculated based on the difference in steering angle θdif in Step S50.

Figure 5A:
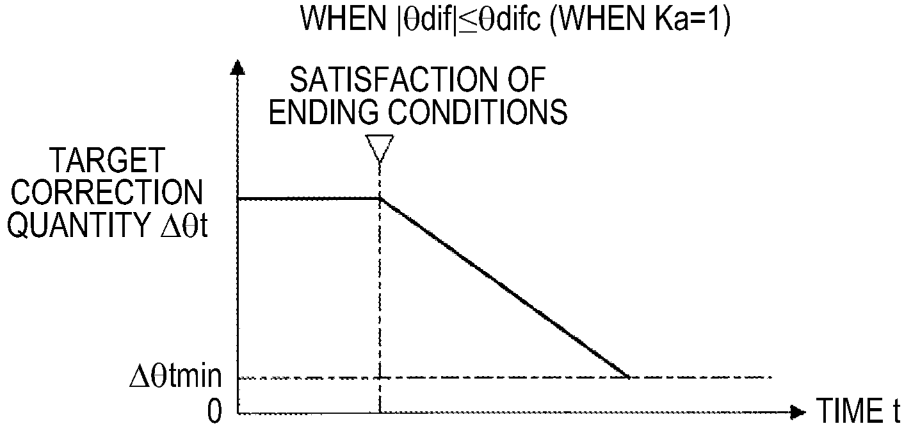
FIG. 5A is a diagram illustrating a relationship between a magnitude relationship between the difference in steering angle θdif and a reference value θdifc and a gradual decrease gradient of a target correction quantity Δθt after LDA ending conditions have been satisfied.

As illustrated in FIG. 4, when the absolute value of the difference in steering angle θdif is equal to or less than the reference value θdifc, the correction factor Ka is set to 1. Accordingly, as illustrated in FIG. 5A, the magnitude of the target correction quantity Δ θt decreases gradually with a basic gradual decrease gradient based on the basic decrease coefficient Kb.

Figure 5B:
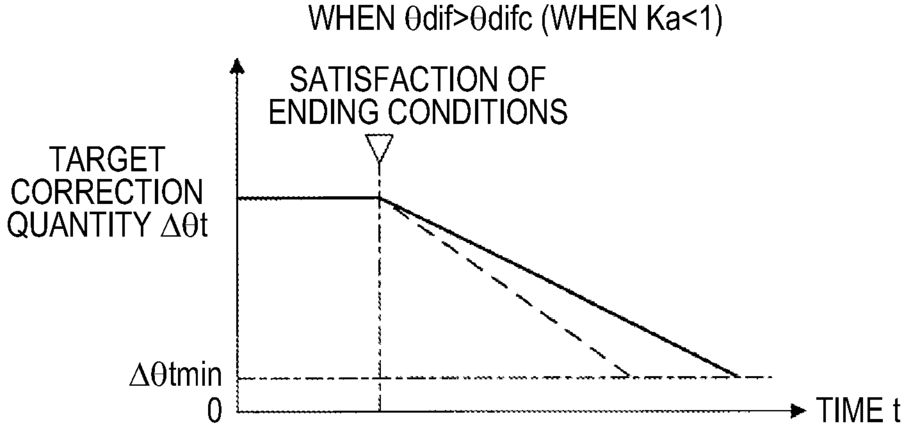
FIG. 5B is a diagram illustrating a relationship between the magnitude relationship between the difference in steering angle θdif and the reference value θdifc and the gradual decrease gradient of the target correction quantity Δθt after LDA ending conditions have been satisfied.

On the other hand, when the magnitude of the target steering angle θt is greater than the actual steering angle θa and the difference in steering angle θdif is a positive value greater than the reference value θdifc, that is, when the correction quantity of the steering angle θ is deficient, the correction factor Ka is set to a value which is less than 1 and which decreases as the difference in steering angle θdif increases. Accordingly, as illustrated in FIG. 5B, the magnitude of the target correction quantity Δθt decreases gradually with a gradual decrease gradient which is less than the basic gradual decrease gradient (the dotted gradient).

Figure 5C:
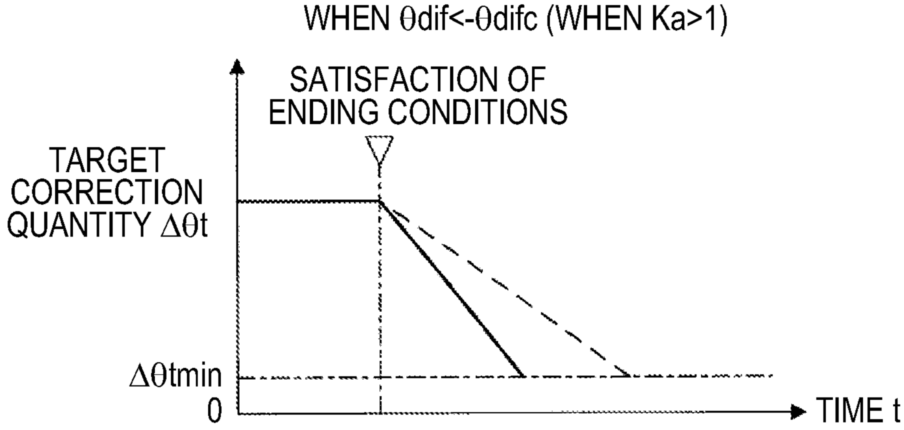
FIG. 5C is a diagram illustrating a relationship between the magnitude relationship between the difference in steering angle θdif and the reference value θdifc and the gradual decrease gradient of the target correction quantity Δθt after LDA ending conditions have been satisfied.

On the other hand, when the magnitude of the actual steering angle θa is greater than the target steering angle θt and the difference in steering angle θdif is a negative value less than-θdifc, that is, when the correction quantity of the steering angle θ is excess, the correction factor Ka is set to a value which is greater than 1 and which increases as the difference in steering angle θdif decreases (as the absolute value of the difference θdif increases). Accordingly, as illustrated in FIG. 5C, the magnitude of the target correction quantity Δθt decreases gradually with a gradual decrease gradient which is greater than the basic gradual decrease gradient (the dotted gradient).

Operation According to Embodiment

Figure 6:
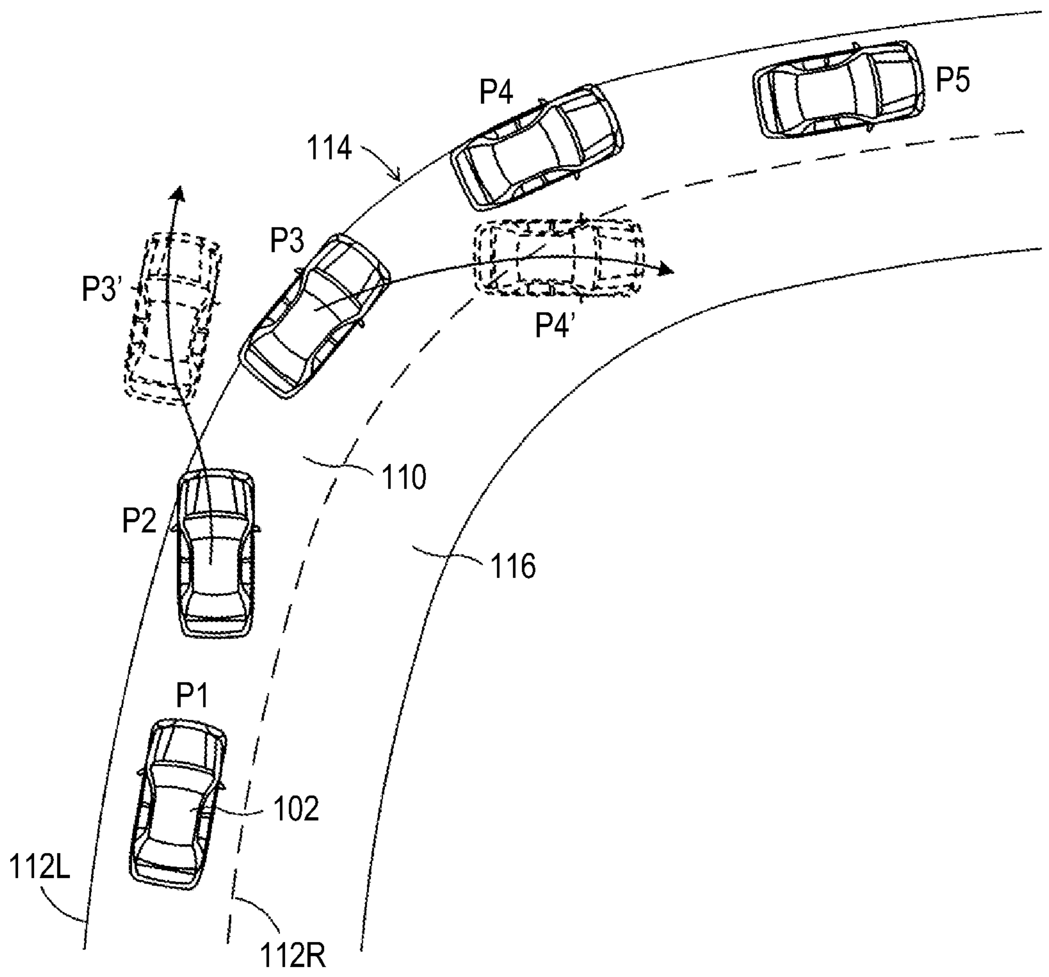
FIG. 6 is a diagram illustrating an operation according to the embodiment when a vehicle is traveling on a curved road.

An operation according to the embodiment will be described below with reference to FIG. 6. As illustrated in FIG. 6, for example, it is assumed that the vehicle 102 travels in a lane 110, a road 114 is curved to right, and the curvature of the lane 110 increases gradually and then decreases gradually. In FIGS. 6, P1 to P5 denote a position of a vehicle varying with traveling of the vehicle 102.

When the vehicle 102 moves from the position P1 to the position P2, it is assumed that the curvature of the lane 110 at the position of the vehicle increases with traveling of the vehicle and a likelihood that the vehicle will depart outward in the curve from the lane 110 occur. A target steering angle θt for preventing the vehicle from departing from the lane is calculated (S10), and the steering angle is controlled such that the actual steering angle θ reaches the target steering angle θt, that is, such that the correction quantity 40 of the steering angle reaches the target correction quantity Δθt, (S30). Accordingly, as illustrated as the position P3 in FIG. 6, the vehicle is prevented from departing from the lane 110.

However, when the vehicle 102 is located at the position P2 or before or after the position P2 and the LDA ending conditions are satisfied (S30), the magnitude of the target correction quantity Δθt decreases gradually. Accordingly, when the gradual decrease gradient of the magnitude of the target correction quantity Δθt is large, the magnitude of the yaw moment Ms for preventing the vehicle 102 from departing from the lane 112 decreases faster. Accordingly, as illustrated as the position P3' in FIG. 6, the likelihood of departure of the vehicle from the lane 110 may not be able to decrease.

On the other hand, according to this embodiment, since the correction factor Ka is set to a value which is less than 1 and which decreases as the difference in steering angle θdif increases, the magnitude of the target correction quantity Δθt decreases gradually with the gradual decrease gradient less than the basic gradual decrease gradient. Accordingly, it is possible to prevent faster decrease of the magnitude of the yaw moment Ms for preventing the vehicle 102 from departing from the lane 112 and thus to decrease the likelihood of departure of the vehicle from the lane 110.

When the vehicle 102 moves from the position P3 to the position P4, it is assumed that the curvature of the lane 110 at the position of the vehicle decreases with traveling of the vehicle, control of the steering angle is performed such that the likelihood that the vehicle will depart inward in the curve from the lane 110 decreases, and the LDA ending conditions have been satisfied (S30) before the vehicle 102 reaches the position P4. It is also assumed that the difference in steering angle θdif at the time point at which the LDA ending conditions have been satisfied is a negative value less than-θdifc and the correction quantity of the steering angle θ is excess.

When the magnitude of the target correction quantity Δθt decreases gradually and the gradual decrease gradient of the magnitude of the target correction quantity Δθt is small, a situation in which the magnitude of the yaw moment Ms for preventing the vehicle 102 from departing from the lane 112 is excess continues. Accordingly, as illustrated as the position P4' in FIG. 6, the likelihood that the vehicle will depart to a neighboring lane 116 inward in the curve from the lane 110 may increase.

On the other hand, according to this embodiment, since the correction factor Ka is set to a value which is greater than 1 and which increases as the difference in steering angle θdif increases, the magnitude of the target correction quantity Δθt decreases gradually with the gradual decrease gradient greater than the basic gradual decrease gradient.

Accordingly, it is possible to prevent a situation in which the magnitude of the yaw moment Ms for preventing the vehicle 102 from departing from the lane 112 is excess from continuing and to decrease the likelihood that the vehicle will depart to the neighboring lane 114 inward in the curve from the lane 110.

FIG. 6 illustrates an example in which there is a likelihood that the vehicle 102 will depart from the curved lane 110 and the LDA ending conditions have been satisfied, and it is similarly possible to decrease the likelihood of departure of the vehicle from the lane 110 even when there is a likelihood of departure of the vehicle from the straight lane 110 and the LDA ending conditions have been satisfied.

Modified Examples

In the aforementioned embodiment, regardless of whether the likelihood of departure from a lane when the vehicle 102 travels on a curved road is directed to being inward in the curve or outward in the curve, the correction factor Ka is set to be variable based on the difference in steering angle θdif. However, the magnitude of the target correction quantity Δθt when there is a likelihood that the vehicle 102 will depart inward in the curve is less than the magnitude of the target correction quantity Δθt when there is a likelihood that the vehicle will depart outward in the curve.

Figure 7:
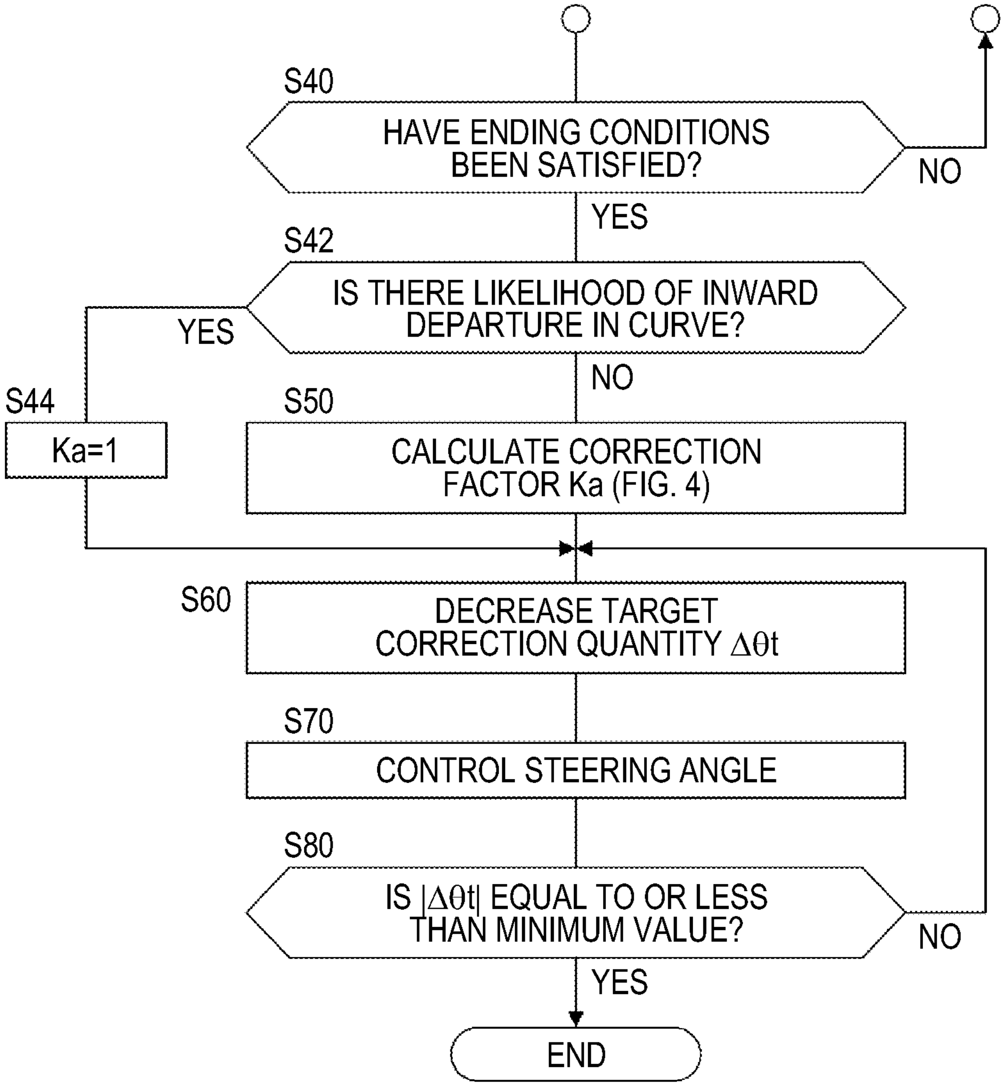
FIG. 7 is a flowchart illustrating a principal part of the LDA routine according to a corrected example.

Accordingly, as illustrated in FIG. 7, in Step S42 prior to Step S50, it may be determined whether there is a likelihood that the vehicle 102 will depart inward in the curve. Step S50 is performed when the determination result is negative, and the correction factor Ka may be set to 1 in Step S44 and then Step S60 may be performed when the determination result is positive.

In general, when it is determined that the lane is curved and the target correction quantity is a correction quantity by which the vehicle is moved outward in the curve from the lane, the target correction quantity is less and a necessity for changing a degree of decrease of the target correction quantity is lower in comparison with a case in which it is determined that the lane is curved and the target correction quantity is a correction quantity by which the vehicle is moved inward in the curve from the lane.

According to this modified example, change of the degree of decrease of the target correction quantity can be omitted when it is determined that the lane is curved and the target correction quantity Δθt is a correction quantity by which the vehicle is moved outward in the curve from the lane.

In Case of LTA

When the LTA switch of the setting operation instrument 18 is turned on, LTA is performed. In Step S10, the CPU sets a target trajectory of the vehicle based on a lane or a trajectory of a preceding vehicle detected by the camera sensor 12. A target steering angle θt for decreasing misalignment of the position of the vehicle from the target trajectory is calculated. The target steering angle θt may be calculated, for example, in the same way as described in Japanese Unexamined Patent Application Publication No. 2017-35925 (JP 2017-35925 A).

Figure 8A:
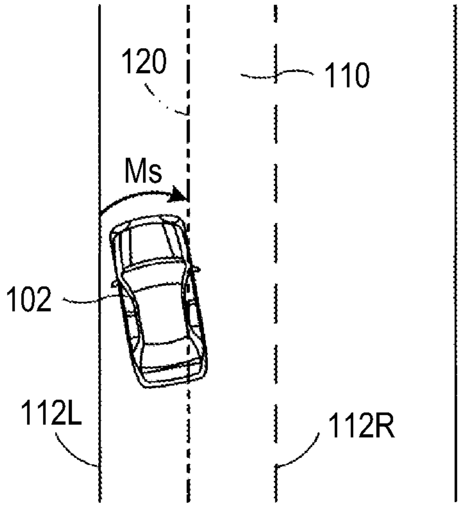
FIG. 8A is a diagram illustrating a relationship between a direction in which a vehicle gets far away from a target trajectory and a control direction of a steering angle θ in LTA.
Figure 8B:
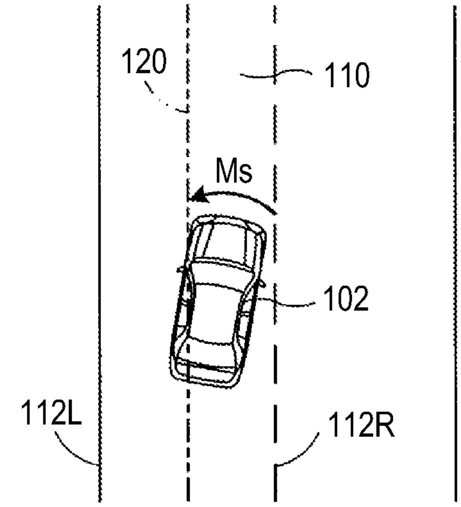
FIG. 8B is a diagram illustrating a relationship between a direction in which a vehicle gets far away from a target trajectory and a control direction of a steering angle θ in LTA.

For example, when there is a likelihood that a reference position such as the center of gravity of the vehicle 102 will depart to the left side from the target trajectory 120 by a reference value or more as illustrated in FIG. 8A, the target steering angle θt is calculated as a steering angle for causing the reference position of the vehicle to approach the target trajectory 120 by applying a yaw moment Ms in the right turning direction to the vehicle 102. On the other hand, when there is a likelihood that the vehicle 102 will depart to the right side from the target trajectory 120 by a reference value or more as illustrated in FIG. 8B, the target steering angle θt is calculated as a steering angle for causing the vehicle to approach the target trajectory 120 by applying a yaw moment Ms in the left turning direction to the vehicle 102. The absolute value of the difference 40 between the target steering angle θt and the actual steering angle θ detected by the steering angle sensor increases as the degree of departure of the vehicle from the target trajectory increases.

In Step S40, the CPU determines whether LTA ending conditions have been satisfied. The CPU temporarily ends this control when the determination result is negative and causes this control to proceed to Step S50 when the determination result is positive.

In this case, it may be determined that the LTA ending conditions have been satisfied when one of the following events is determined.

D: The travel control device 100 does not function normally due to failure of the camera sensor 12, abnormality of the EPS device 42, abnormality of the wheel speed sensor, or the like.

E: A steering operation or an operation of turning off the LTA switch is performed by a driver such as the driver's override steering or the driver's operating a direction indicator.

F: A situation in which a target trajectory cannot be set and LTA cannot continue occurs on a road such as loss of white lines or an obstacle on the road.

Other steps subsequent to Step S20 are performed in the same way as in the aforementioned embodiment or modified examples. Accordingly, in the case of LTA, similarly to the case of LDA, it is possible to decrease the likelihood of departure of a vehicle from a lane when the LTA ending conditions have been satisfied in comparison with a case in which the correction factor Ka is not set to be variable based on the difference in steering angle θdif.

As can be seen from the aforementioned description, according to the embodiment and the modified examples, the gradual decrease gradient of the magnitude of the target correction quantity Δθt is changed depending on whether the correction quantity of the steering angle θ at the time point at which the LDA or LTA ending conditions have been satisfied is deficient or excess. Accordingly, in both the case in which the correction quantity of the steering angle θ is deficient and the case in which the correction quantity of the steering angle θ is excess, it is possible to decrease the likelihood of departure of the vehicle from the lane in comparison with a case in which the gradual decrease gradient of the magnitude of the target correction quantity Δθt is not changed.

Particularly, according to the embodiment and the modified examples, when the actual control quantity (the magnitude of the actual steering angle θa) is greater than the target control quantity (the magnitude of the target steering angle θt), the degree of decrease of the target correction quantity becomes greater in comparison with a case in which the target control quantity is greater than the actual control quantity (see FIG. 5C). Accordingly, in a situation in which the actual control quantity is greater than the target control quantity, it is possible to decrease the likelihood that unnecessary travel control will continue for a long time. On the other hand, when the actual control quantity is greater than the target control quantity, the degree of decrease of the target correction quantity does not increase. Accordingly, in a situation in which the actual control quantity is greater than the target control quantity, it is possible to decrease the likelihood that travel control will be ended early.

More specifically, when it is determined that the actual control quantity is greater than the target control quantity and the difference between the actual control quantity and the target control quantity is greater than the first reference value, the degree of decrease of the target correction quantity increases (see FIG. 5C). Accordingly, the degree of decrease of the target correction quantity is not changed in a situation in which the difference between the actual control quantity and the target control quantity is small and a necessity for increasing the degree of decrease of the target correction quantity is low, and the degree of decrease of the target correction quantity is increased in a situation in which a necessity for increasing the degree of decrease of the target correction quantity is high.

The degree of decrease of the target correction quantity increases as the difference between the actual control quantity and the target control quantity increases (see FIG. 4). Accordingly, since the degree of decrease of the target correction quantity can be increased as the difference between the actual control quantity and the target control quantity increases, it is possible to early end automatic steering using the automatic steering device even when the difference between the actual control quantity and the target control quantity is large.

On the other hand, when it is determined that the target control quantity is greater than the actual control quantity and the difference between the target control quantity and the actual control quantity is greater than the second reference value, the degree of decrease of the target correction quantity decreases (see FIG. 5B). Accordingly, the degree of decrease of the target correction quantity is not changed in a situation in which the difference between the target control quantity and the actual control quantity is small and a necessity for decreasing the degree of decrease of the target correction quantity is low, and the degree of decrease of the target correction quantity is decreased in a situation in which a necessity for decreasing the degree of decrease of the target correction quantity is high.

The degree of decrease of the target correction quantity decreases as the difference between the target control quantity and the actual control quantity increases (see FIG. 4). Accordingly, since the degree of decrease of the target correction quantity decreases as the difference between the target control quantity and the actual control quantity increases, it is possible to continuously perform automatic steering using the automatic steering device longer as the difference between the target control quantity and the actual control quantity increases.

While a specific embodiment and modified example of the disclosure have been described above in detail, the disclosure is not limited to the aforementioned embodiment and modified example, and it will be apparent to those skilled in the art that the disclosure can be modified in various forms within the scope of the disclosure.

For example, in the embodiment and the modified example, in Step S50, the correction factor Ka is calculated based on the target steering angle θt and the actual steering angle θ in a current control cycle. However, for example, when information of the actual steering angle θ is not acquired at a time point at which it is determined that control ending conditions have been satisfied, the correction factor Ka may be calculated based on the target steering angle θt in the current control cycle and the actual steering angle θ in the previous control cycle. That is, the correction factor Ka has only to be calculated based on the target steering angle θt and the actual steering angle θ in a control cycle closest to the time point at which it is determined that control ending conditions have been satisfied.

In the embodiment and the modified example, a target control quantity associated with turning of a vehicle and an actual control quantity associated with turning of the vehicle are the target steering angle θt and the steering angle θ. However, the control quantity may be a lateral acceleration of the vehicle, a yaw rate of the vehicle, an estimated lateral acceleration of the vehicle (a product of the vehicle speed and the yaw rate of the vehicle), or a yaw moment of the vehicle. An example of the technique of calculating the target lateral acceleration of a vehicle in LDA and LTA is described in Japanese Unexamined Patent Application Publication No. 2017-65273 (JP 2017-65273 A). An example of the technique of calculating the target yaw rate of a vehicle and the target lateral acceleration of the vehicle in LTA is described in Japanese Unexamined Patent Application Publication No. 2010-6279 (JP 2010-6279 A).

When the control quantity is a lateral acceleration of the vehicle, a yaw rate of the vehicle, an estimated lateral acceleration of the vehicle, or a yaw moment of the vehicle, the target correction quantity Δθt of the steering angle θ is calculated based on the difference between the target control quantity and the actual control quantity and control is performed such that the correction quantity 40 of the steering angle θ reaches the target correction quantity Δθt in Step S30.

The correction factor Ka may be calculated from the same map as indicated by the solid line in FIG. 4 based on the difference between the target control quantity and the actual control quantity or may be calculated from the map corresponding to the solid line in FIG. 4 based on the difference θdif between the target steering angle θt and the actual steering angle θa similarly to the embodiment.

In the embodiment and the modified example, the correction factor Ka is calculated from the map corresponding to the solid line in FIG. 4 based on the difference in steering angle θdif in Step S50, and the correction factor Ka is 1 when the absolute value of the difference in steering angle θdif is equal to or less than the reference value θdifc. However, the correction factor Ka may be calculated from a map corresponding to the dotted line in FIG. 4 based on the difference in steering angle θdif.

In the embodiment and the modified example, the correction factor Ka decreases as the difference in steering angle θdif increases in a range equal to or greater than the reference value θdifc and increases as the difference in steering angle θdif decreases in a range equal to or less than the reference value-θdifc. However, the correction factor Ka may be a constant value in the range in which the difference in steering angle θdif is equal to or greater than the reference value θdifc and/or the range in which the difference in steering angle θdif is equal to or less than the reference value −θdifc.

Figure 9A:
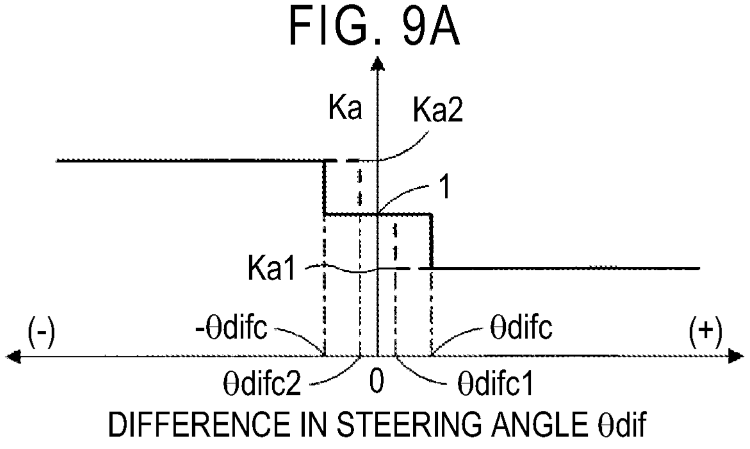
FIG. 9A is a diagram illustrating another example of the relationship between the difference in steering angle θdif and the correction factor Ka.

For example, in a first corrected example illustrated in FIG. 9A, when the absolute value of the difference in steering angle θdif is equal to or less than the reference value θdifc, the correction factor Ka is 1 similarly to the embodiment. However, the correction factor Ka is a positive constant Ka1 less than 1 when the difference in steering angle θdif is in a range greater than the reference value θdifc, and the correction factor Ka is a positive constant Ka2 greater than 1 when the difference in steering angle θdif is in a range less than the reference value-θdifc.

As indicated by a dotted line in FIG. 9A, in the first corrected example, when the difference in steering angle θdif decreases from a value greater than the reference value θdifc, the correction factor Ka may be kept at the positive constant Ka1 until the difference in steering angle θdif becomes θdifc1 less than the reference value θdifc. In this case, a situation in which the gradual decrease gradient of the magnitude of the target correction quantity Δθt decreases can be maintained until the difference in steering angle θdif becomes θdifc1 less than the reference value θdifc.

Similarly, as indicated by a dotted line in FIG. 9A, in the first corrected example, when the difference in steering angle θdif increases from a value less than the reference value −θdifc, the correction factor Ka may be kept at the positive constant Ka2 until the difference in steering angle θdif becomes θdifc2 greater than the reference value −θdifc. In this case, a situation in which the gradual decrease gradient of the magnitude of the target correction quantity Δθt increases can be maintained until the difference in steering angle θdif becomes θdifc2 greater than the reference value −θdifc.

Figure 9B:
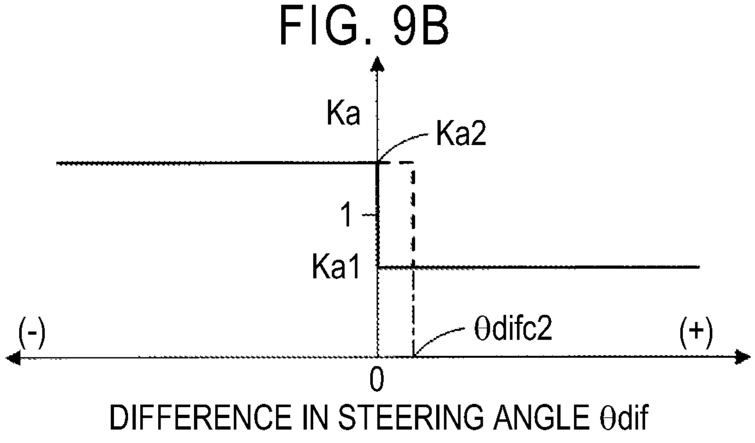
FIG. 9B is a diagram illustrating another example of the relationship between the difference in steering angle θdif and the correction factor Ka.

In a second corrected example illustrated in FIG. 9B, when the difference in steering angle θdif is 0, the correction factor Ka is 1. However, the correction factor Ka is a positive constant Ka1 less than 1 when the difference in steering angle θdif is a positive value, and the correction factor Ka is a positive constant Ka2 greater than 1 when the difference in steering angle θdif is a negative value.

As indicated by a dotted line in FIG. 9B, in the second corrected example, when the difference in steering angle θdif increases from a value less than the reference value 0, the correction factor Ka may be maintained at the positive constant Ka2 until the difference in steering angle θdif becomes θdifc2 greater than the reference value 0. In this case, a situation in which the gradual decrease gradient of the magnitude of the target correction quantity Δθt increases can be maintained until the difference in steering angle θdif becomes θdifc2 greater than the reference value 0.

Figure 9C:
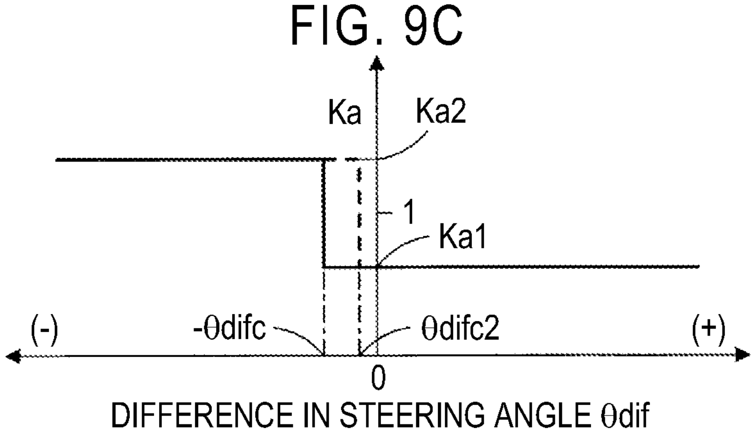
FIG. 9C is a diagram illustrating another example of the relationship between the difference in steering angle θdif and the correction factor Ka.

In a third corrected example illustrated in FIG. 9C, the correction factor Ka is a positive constant Ka1 less than 1 when the difference in steering angle θdif is in a range greater than the reference value −θdifc, and the correction factor Ka is a positive constant Ka2 greater than 1 when the difference in steering angle θdif is equal to or less than the reference value −θdifc.

As indicated by a dotted line in FIG. 9C, in the third corrected example, when the difference in steering angle θdif increases from a value less than the reference value −θdifc, the correction factor Ka may be kept at the positive constant Ka2 until the difference in steering angle θdif becomes θdifc2 greater than the reference value −θdifc. In this case, a situation in which the gradual decrease gradient of the magnitude of the target correction quantity Δθt increases can be maintained until the difference in steering angle θdif becomes θdifc2 greater than the reference value −θdifc.

Figure 9D:
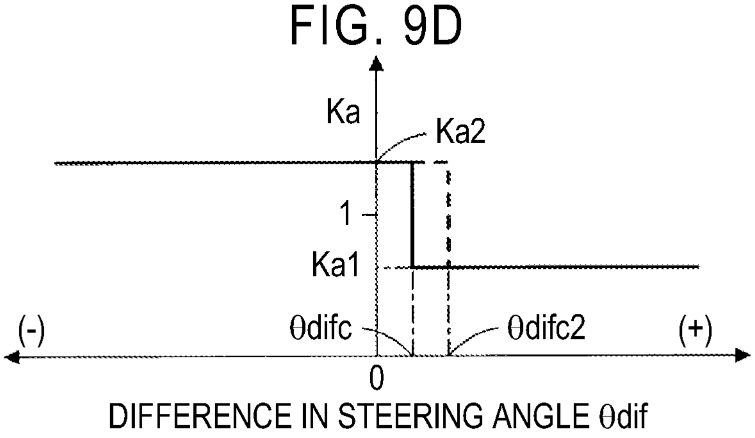
FIG. 9D is a diagram illustrating another example of the relationship between the difference in steering angle θdif and the correction factor Ka.

In a fourth corrected example illustrated in FIG. 9D, the correction factor Ka is a positive constant Ka1 less than 1 when the difference in steering angle θdif is in a range greater than the reference value θdifc, and the correction factor Ka is a positive constant Ka2 greater than 1 when the difference in steering angle θdif is equal to or less than the reference value θdifc.

As indicated by a dotted line in FIG. 9D, in the fourth corrected example, when the difference in steering angle θdif increases from a value less than the reference value θdifc, the correction factor Ka may be maintained at the positive constant Ka2 until the difference in steering angle θdif becomes θdifc2 greater than the reference value θdifc. In this case, a situation in which the gradual decrease gradient of the magnitude of the target correction quantity Δθt increases can be maintained until the difference in steering angle θdif becomes θdifc2 greater than the reference value θdifc.

In the embodiment, the modified example, and the first corrected example, the first reference value is the reference value θdifc, the second reference value is the reference value −θdifc, and the absolute values of the first and second reference values are the same. However, the absolute values of the first and second reference values may be different values.

In the embodiment and the modified example, a decrease of a rate of decrease of the magnitude of the target correction quantity Δθt is achieved by decreasing the gradual decrease gradient of the magnitude of the target correction quantity Δθt. However, the decrease of the rate of decrease of the magnitude of the target correction quantity Δθt may be achieved by delaying start of the gradual decrease of the magnitude of the target correction quantity Δθt or may be achieved by both the decrease of the gradual decrease gradient of the magnitude of the target correction quantity Δθt and the delay of the start of the gradual decrease.

In the embodiment and the modified example, the decrease of the rate of decrease of the magnitude of the target correction quantity Δθt is performed with a constant gradient. However, the magnitude of the target correction quantity Δθt may decrease at a rate of decrease at which the gradual decrease gradient varies.

Figure 10:
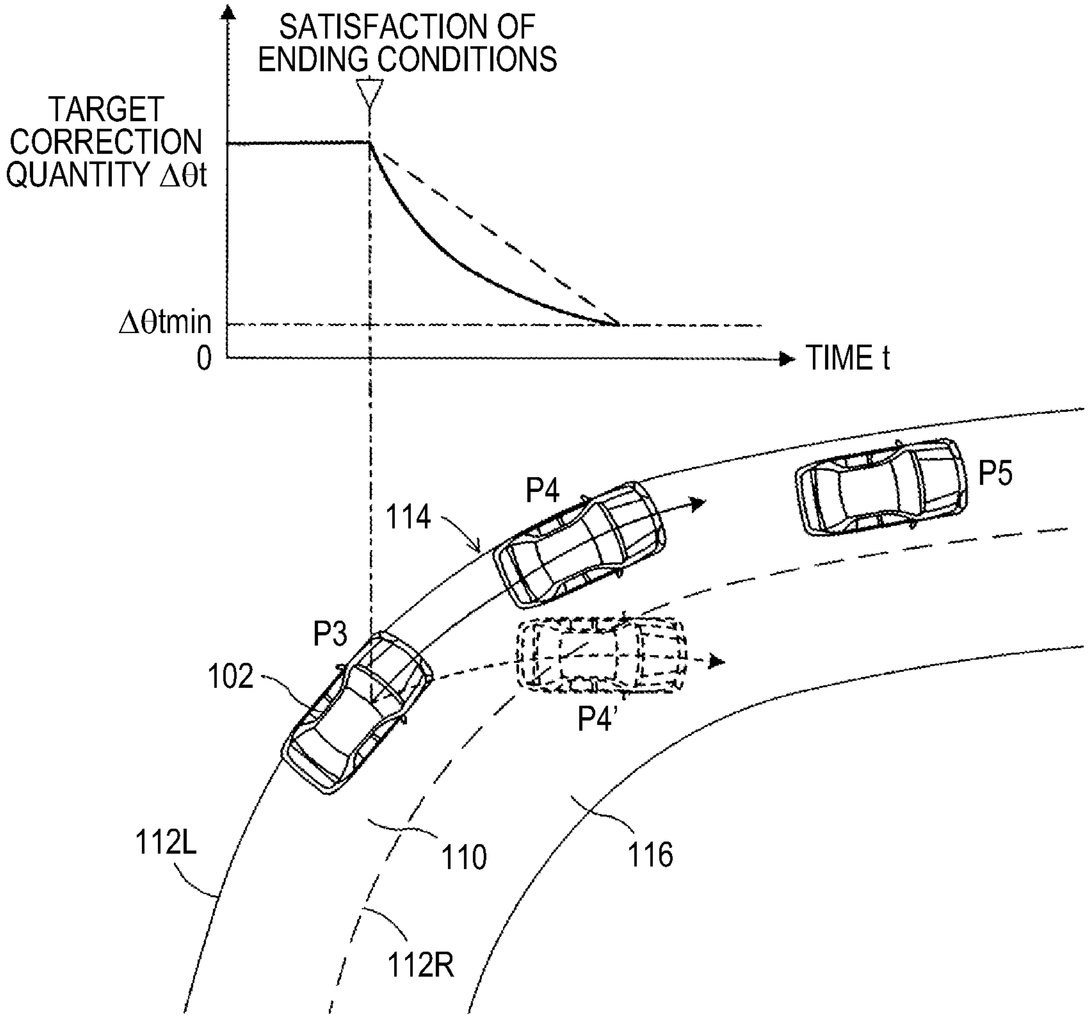
FIG. 10 is a diagram illustrating an example of a nonlinear decrease gradient of the magnitude of the target correction quantity Δθt when a vehicle is traveling in a lane of which the curvature varies with traveling of the vehicle.

Particularly, the decrease gradient of the magnitude of the target correction quantity Δθt may change according to future change of the curvature of a lane ascertained at the time point at which LDA or LTA ending conditions have been satisfied. For example, when the future curvature of the lane decreases as illustrated in FIG. 10, the decrease gradient may be set to be larger immediately after the magnitude of the target correction quantity Δθt has started decreasing, and the decrease gradient may be set to decrease with the elapse of time. In FIG. 10, a dotted line represents a standard gradient when the correction factor Ka is 1.

What is claimed is:

1. A travel control device for a vehicle, the travel control device comprising:

an object information acquisition device configured to acquire information of an object in front of the vehicle;

an automatic steering device; and an electronic control unit configured to perform travel control of the vehicle, wherein the travel control includes identifying a lane based on the information acquired by the object information acquisition device, calculating a target control quantity associated with turning for allowing the vehicle to travel along the lane within the lane, calculating a target correction quantity of a steering angle for causing an actual control quantity to reach the target control quantity, the actual control quantity being associated with turning of the vehicle, and causing the vehicle to travel along the lane within the lane by controlling the automatic steering device such that a correction quantity of the steering angle reaches the target correction quantity, the electronic control unit is configured to gradually decrease the target correction quantity of the steering angle when the electronic control unit determines that the travel control needs to be ended, wherein based on the actual control quantity being greater than the target control quantity at a time closest to a time point at which the electronic control unit determines that the travel control needs to be ended, the control unit is configured to set a degree of decrease of the target correction quantity as a first degree of decrease, based on the target control quantity being greater than the actual control quantity at the time closest to the time point at which the electronic control unit determines that the travel control needs to be ended, the electronic control unit is configured to set the degree of decrease of the target correction quantity as a second degree of decrease, the first degree of decrease is different from the second degree of decrease, when the degree of decrease of the target correction quantity is set as the first degree of decrease, a time until the decrease of the target correction quantity ends is a first time, when the degree of decrease of the target correction quantity is set as the second degree of decrease, the time until the decrease of the target correction quantity ends is a second time, and the first time is different from the second time.

2. The travel control device according to claim 1, wherein the electronic control unit is configured to set the first degree of decrease to be greater than the second degree of decrease.

3. The travel control device according to claim 1, wherein the electronic control unit is configured to set the first degree of decrease to be greater than the second degree of decrease, and the electronic control unit is configured to set the degree of decrease of the target correction quantity to be the first degree of decrease when the electronic control unit determines that (i) the actual control quantity is greater than the target control quantity and (ii) a difference between the actual control quantity and the target control quantity is equal to or greater than a first reference value.

4. The travel control device according to claim 1, wherein the electronic control unit is configured to set the first degree of decrease to be greater than the second degree of decrease, and the electronic control unit is configured to set the degree of decrease of the target correction quantity to be the second degree of decrease when the electronic control unit determines that (i) the target control quantity is greater than the actual control quantity and (ii) a difference between the target control quantity and the actual control quantity is equal to or greater than a second reference value.

5. The travel control device according to claim 3, wherein the electronic control unit is configured to set the degree of decrease of the target correction quantity to increase as the difference between the actual control quantity and the target control quantity increases.

6. The travel control device according to claim 4, wherein the electronic control unit is configured to set the degree of decrease of the target correction quantity to decrease as the difference between the target control quantity and the actual control quantity increases.

7. The travel control device according to claim 4, wherein the electronic control unit is configured to set the degree of decrease of the target correction quantity to decrease through at least one of a decrease of a rate of decrease of the target correction quantity and a delay of start of decrease of the target correction quantity.

8. The travel control device according to claim 1, wherein the electronic control unit is configured not to change the degree of decrease of the target correction quantity when the target correction quantity is a correction quantity by which the vehicle is moved outward in the curved lane from the lane and the electronic control unit determines that the lane is curved.

9. The travel control device according to claim 1, wherein:

the electronic control unit is configured to estimate a likelihood of departure of the vehicle from the lane based on the information acquired by the object information acquisition device, and the electronic control unit is configured to calculate the target control quantity associated with turning as a target control quantity for decreasing the likelihood of departure when the electronic control unit determines that the likelihood of departure is present.

10. The travel control device according to claim 1, wherein:

the electronic control unit is configured to set a target trajectory for allowing the vehicle to travel along the lane within the lane based on the information acquired by the object information acquisition device, and the electronic control unit is configured to calculate the target control quantity associated with turning as a target control quantity for causing the vehicle to travel along the target trajectory.

* * * * *